United States Patent [19]

Le Vitt

[11] 3,813,597
[45] May 28, 1974

[54] TACHOMETER FOR LOW SPEED MEASUREMENT

[75] Inventor: Richard M. Le Vitt, Albany, Calif.

[73] Assignee: East Bay Municipal Utility District, Oakland, Calif.

[22] Filed: Jan. 5, 1973

[21] Appl. No.: 321,398

[52] U.S. Cl. .................................. 324/176, 73/229
[51] Int. Cl. ............................................. G01p 3/42
[58] Field of Search .................... 324/176, 160, 178; 73/229-231

[56] References Cited
UNITED STATES PATENTS 2,575,494  11/1951  Hornfeck ........................... 324/176
2,921,259  1/1960   Tice .................................... 324/176
3,406,336  10/1968  McCampbell ....................... 324/176

Primary Examiner—Michael J. Lynch
Attorney, Agent, or Firm—Robert M. Slick

[57] ABSTRACT

A tachometer is provided which is capable of detecting and/or recording very low rates of revolution. A typical application of the tachometer is described in conjunction with a flow rate recorder for a water meter.

5 Claims, 4 Drawing Figures

PATENTED MAY 28 1974 3,813,597

TACHOMETER FOR LOW SPEED MEASUREMENT

SUMMARY OF THE INVENTION

Conventional tachometers of the electric type ordinarily employ some form of electric generating element. Since an appreciable speed must be achieved before a usable current is developed, such devices are ordinarily useless at extremely low rates of revolution. The present invention does not employ a generator element but instead a potentiometer which is supplied with a suitable voltage and the change in voltage at the wiper is differentiated, filtered and recorded or otherwise detected.

This application of a potentiometer to generate a rate signal differs from previous applications in that a clean, usable signal is developed from a wiper which may be rotating continuously, rather than rotating over a limited angle.

The device of the present invention is very sensitive and in the preferred embodiment is capable of detecting speeds as low as one revolution every 2 or 3 hours but it can be made even more sensitive. The preferred embodiment has low power consumption and low driving torque requirements.

One typical application of the device of the present invention is in a recording device for use with water meters wherein the rate of flow can be detected from very low to very high levels and recorded. This is extremely important for water utilities since if a meter is supplied to a customer which is much larger than that required for the greatest expected demand, the meter expense is increased and there is a lowered sensitivity with respect to low flow rates. On the other hand, if the meter is too small, it will wear out rapidly, causing frequent replacement and thus unwarranted expense. Also, it is useful to be able to record flow rates to detect otherwise unsuspected leaks.

The flow meters heretofore available ordinarily require calculations or a special reading device to determine the rate of flow at any particular time. The device of the present invention is flexible with respect to flow rates and gives a direct readout which does not require calculations.

Further, such devices are not universally applicable so that one ordinarily must buy recording registers made for a particular make of meter. The device of the present invention can be readily applied to any water meter regardless of its make, using simple, inexpensive coupling devices.

Further, the device of the present invention is very versatile so that a single device can be easily set for use on meters of all sizes from the smallest residential meters to the largest commercial meters merely by setting the switches on the device and will give a full scale deflection on any desired flow rate.

The device of the present invention employs an efficient filtering system so that the final record is free from unwanted responses.

Other objects and features of the invention will be brought out in detail in the balance of the specification.

DESCRIPTION OF THE PREFERRED EMBODIMENTS

Figure 1:
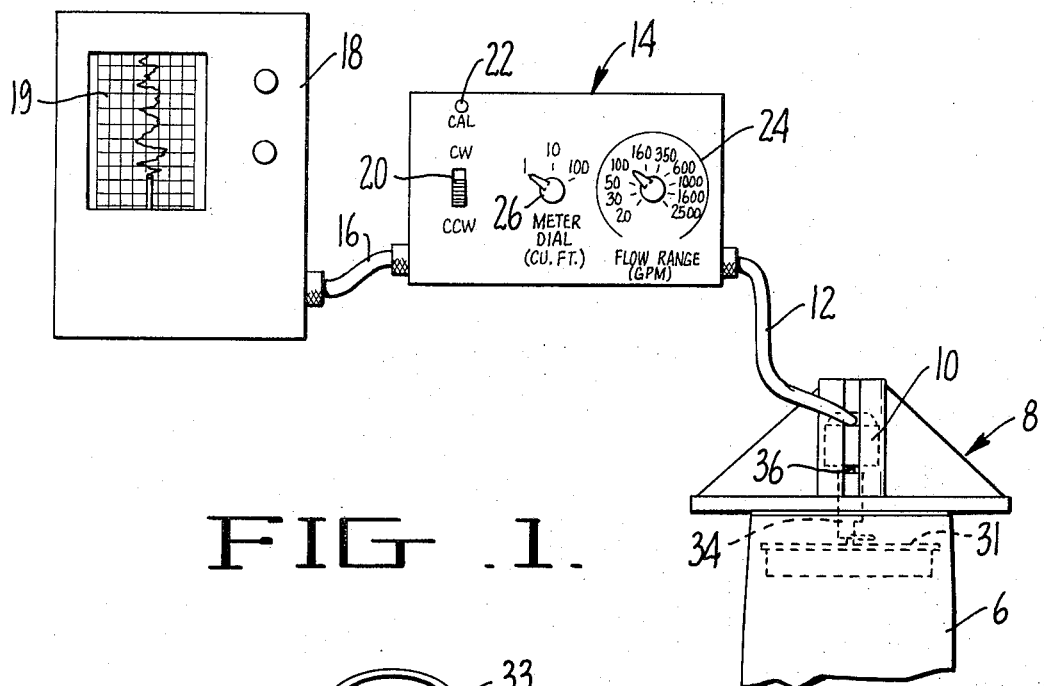
FIG. 1 is a perspective view of a device embodying the present invention showing the potentiometer support mounted on a typical water meter.
Figure 2:
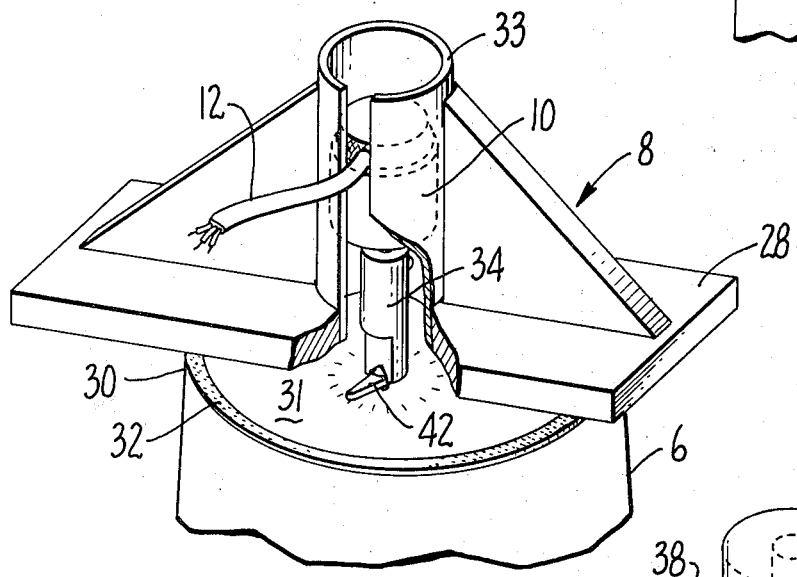
FIG. 2 is a top perspective view of the head assembly which holds the potentiometer on the water meter.

Referring now to the drawings by reference characters, a typical installation is shown in FIGS. 1 and 2. A water meter 6 holds the potentiometer support 8 with the potentiometer 10 mounted thereon, coupled to a pointer 42 of the water meter as hereinafter described in detail. The potentiometer is connected by suitable wiring 12 to the control unit 14 which constitutes the gist of the present invention and the output is connected through suitable wiring 16 to a recording meter 18. The control unit 14 has a switch 20 thereon which can be set in accordance with the direction of rotation of the water meter pointer, a calibration adjustment 22 and a range switch 24, ordinarily calibrated in gallons per minute, which is used to set the full scale reading of the recording meter and which is ordinarily set to the largest expected flow rate. A switch 26 is also provided for setting the device in accordance with the capacity of the pointer to which the potentiometer is applied. Normally the potentiometer is attached to the initial or lowest reading dial pointer on the water meter which conventionally is 1, 10, or 100 cubic feet per revolution and switch 26 is turned to the appropriate position.

Figure 3:
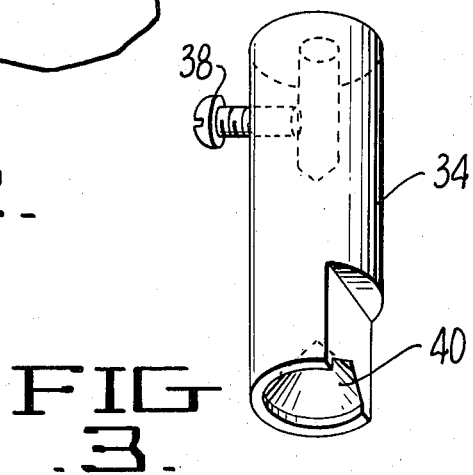
FIG. 3 is a bottom perspective view of a typical coupler for coupling the potentiometer to the dial pointer of the meter.

The method of fastening the potentiometer to the water meter is shown in FIGS. 2 and 3. The potentiometer support generally designated 8 includes a base member 28 which is adapted to rest on the bezel 30 of the meter 6. The slotted tube 33 acts as a guide to hold the potentiometer 10 in position over the meter face. Gravity holds the potentiometer and coupler assembly on the pointer. The face 31 of the meter ordinarily has a glass cover thereover which is removed and a thin bead of an adhesive such as a silicone rubber 32 is applied on the bezel to hold the support 8 in place. A suitable connector 34 is fastened to the shaft 36 of the potentiometer by means of a set screw 38 and the notch 40 at the opposite end placed over one of the pointers 42 of the meter. Normally one would select the pointer which moves the fastest, i.e., the initial pointer wherein one revolution represents the smallest volume of water passing through the meter. The connectors 34 can be made in various forms with a suitable notch 40 formed therein to conform to the shape of the pointer so that the shaft 36 will be turned by movement of the pointer. The connectors are designed to align the shaft of the potentiometer with the shaft of the pointer. Alignment is necessary to minimize errors in transmission of angular speed from the pointer shaft to the potentiometer shaft. From the above it can be seen that the installation of the present invention on any water meter is a very simple matter. Ordinarily it is sufficient to merely place the potentiometer support over the meter face where it will be held by an adhesive. If the device is used on electrical or gas meters which normally have vertical faces, the potentiometer support can be held in place with a suitable clamp, and the potentiometer can be held in place by a suitable retainer.

Figure 4:
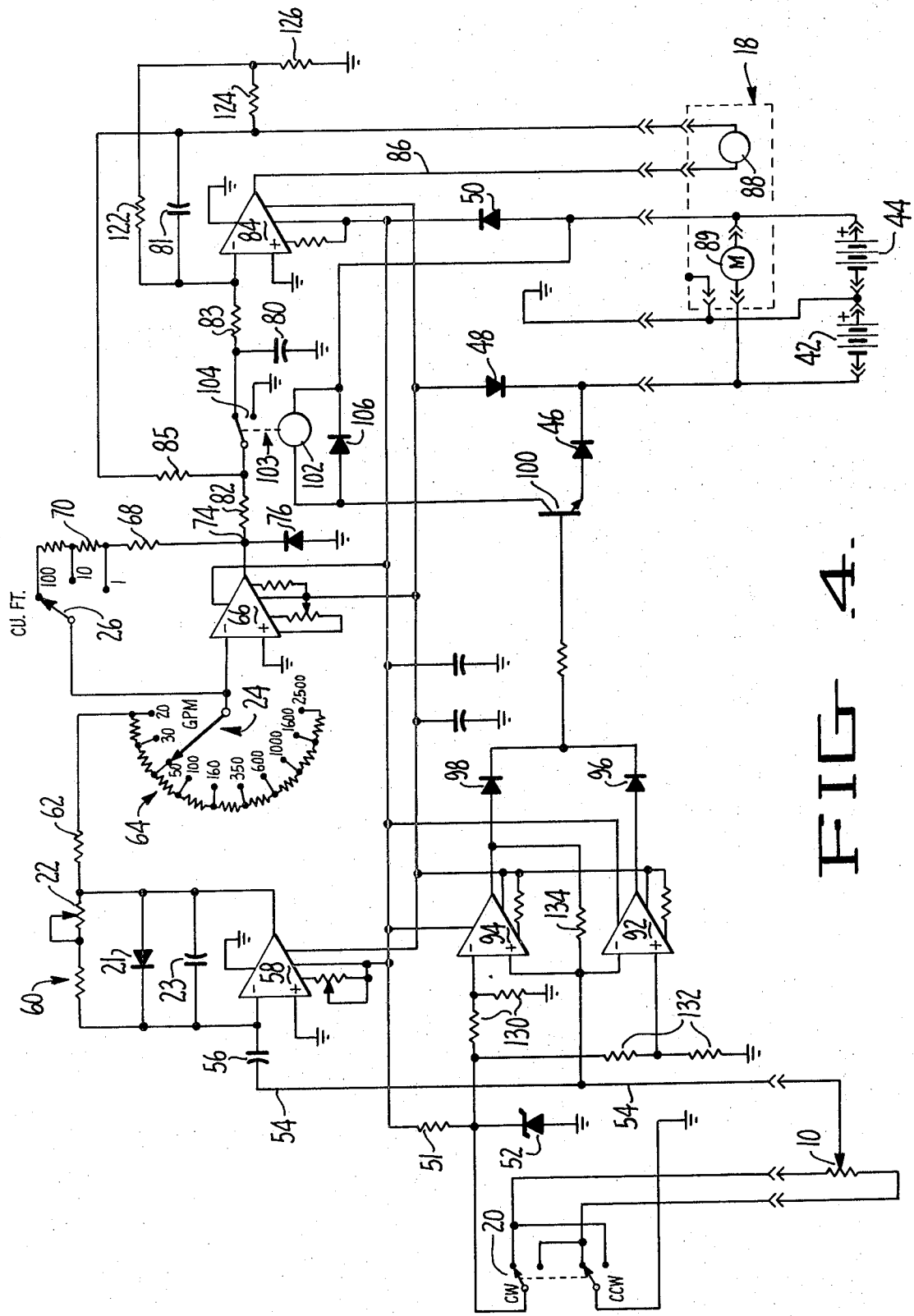
FIG. 4 is a schematic diagram of the electronic circuitry of the tachometer.

In FIG. 4 the electrical circuitry is shown in detail. The potentiometer 10 is a linear taper device of the continuous rotation type having a very small dead space between the ends of the resistance element. The ends of the resistance element of the potentiometer are connected to the rest of the instrument through a double pole double throw switch 20 which can be set for clockwise or counterclockwise rotation of the meter pointer.

The power supply for the unit can consist of two batteries 42 and 44 which are in series with the center grounded so that both positive and negative voltages with respect to ground can be supplied to the amplifiers. Preferably diodes 46, 48 and 50 are employed to avoid injury to the circuitry if one or both of the batteries should be inadvertantly reversed.

Voltage is supplied to the ends of potentiometer 10 through a resistor 51 with a zener diode 52 across the output so that a low, constant voltage is always applied to the potentiometer. The connection from the wiper of the potentiometer is taken through line 54 through a capacitor 56 to the inverting input of operational amplifier 58. It is apparent that by introducing output of the potentiometer through capacitor 56 that the amplifier acts as a differentiator and responds only to changes in voltage and not to a steady voltage. The differentiator circuit of amplifier 58 is standard except for doide 21, which is essential in this application. The diode discharges capacitor 56 as the potentiometer wiper touches the grounded end of the resistance element, and thus prepares the capacitor for another revolution of the potentiometer. Amplifier 58 is provided with a feedback circuit generally designated 60 which includes a variable resistor 22 which serves as a calibration adjustment and can conveniently be a screwdriver adjustment on the face of the control unit 14. Capacitor 23 serves to stabilize amplifier 58. Output is taken through a resistor 62 and may be taken through one or more of the resistors of the resistor bank 64 as is later explained in detail, to the inverting input of amplifier 66. Amplifier 66 is provided with a feedback circuit which includes a fixed resistor 68 and selectable resistors 70.

It is obvious that the gain of amplifier 66 is determined by the ratio of the sum of resistors 68 and 70 to the sum of the resistors 62 and 64. The resistors 68 and 70 are selected to yield gains depending on the volume represented by the pointer which drives the potentiometer. Thus, in the embodiment shown, switch 26 can be set to select 1, 10 or 100 cubic feet, depending on the volume represented by one revolution of the driving pointer. The resistors 62 and 64 are selected to secure a full scale reading on the chart recorder 18 at the highest expected flow rate. This insures that the scale selected on the meter will be large enough to give easily read deflections, yet the meter will not go off scale at the largest expected flow rate of the particular water meter. For instance, if the largest expected flow rate is 100 gallons per minute, the switch 24 would be turned to the fourth position and the full scale deflection on the chart 19 would represent 100 gallons per minute. The device can be calibrated in other convenient units of flow and capacity by merely changing the values of resistors 62, 64, 68, and 70.

Output from amplifier 66 is taken through line 74 and a diode 76 suppresses unwanted transients.

The output is passed to the circuitry of amplifier 84, which, when the contact 104 of relay 103 is closed as shown, acts as a two pole filter to smooth the signal applied to the meter movement 88 of the recorder 18. The response characteristics of the filter are primarily determined by the values of capacitors 80 and 81, and resistors 82, 83, and 85.

As the wiper of potentiometer 10 leaves the active region of the resistance element, the normal signal to amplifier 58 is discontinued. This would have an undesirable effect on the output of amplifier 84, so a means (to be described in detail later) is provided to detect when the wiper is in the dead space and momentarily disconnect amplifier 84 via contact 104. The circuit of amplifier 84 is arranged so that such a disconnection will have minimal effect on the output record. For example, if the potentiometer shaft had been rotating at a constant speed at the moment contact 104 opened, the capacitor 81 would hold its charge for a time, thus tending to maintain a constant output to the meter movement 88. If the potentiometer shaft had been accelerating or decelerating, capacitor 80 would have a charge tending to increase or decrease the output signal, as appropriate. Therefore, under normal circumstances the output record is approximately correct over brief intervals during which contact 104 is open.

It should be noted that in the event the shaft of potentiometer 10 is suddenly stopped when the wiper is in the dead space, the output will slowly decay to zero at a rate controlled by capacitor 81 and resistors 122, 124, and 126.

The output from amplifier 84 is taken through line 86 to the meter movement 88 of the chart recorder 18. The meter movement employed in the preferred embodiment is a low resistance, current sensitive type. It will be noted that the feedback network of amplifier 84 is actually taken through the meter so that in effect variations in the resistance of various meter movements will not change the output indication.

Amplifiers 92 and 94 are used as voltage comparators to detect when the potentiometer wiper traverses the dead space. The comparator inputs are connected to the wiper of potentiometer 10 and to voltage dividers 130 and 132. When the wiper approaches the positive end of the resistance element, the voltage at the wiper slightly exceeds the voltage at the inverting input of comparator 94 (set by divider 130) and thus the output of 94 swings positive. When the wiper leaves the resistance element, the output of 94 is held positive by resistor 134. The positive output of 94 passes through diode 98, switches on transistor 100, and thereby energizes coil 102 of reed relay 103 causing contact 104 to open. As the wiper touches the grounded end of the resistance element, the output of 94 swings negative, capacitor 56 discharges via diode 21, and the output of comparator 92 swings positive, passes through diode 96, and energizes relay 103 as above. The output of 92 remains positive until the voltage on the wiper surpasses the low threshold set by divider 132. Diode 106 is employed merely to take care of inductive kickback from coil 102. Other means could obviously be used to suppress the potentiometer output during these intervals, such as a mechanical switch linked to the wiper of potentiometer 10 to actuate contact 104 during the crossover time. Another alternate technique is to use two potentiometers with a common shaft connected to two differentiators. The recording device is then automatically switched from one to the other so that each potentiometer is used only when its wiper is in the active region.

Amplifiers 58 and 84 are low input current types to maintain accuracy at low rates of revolution. Amplifiers 66, 92, and 94 can be general purpose types.

The chart recorder 18 can be of any suitable type but in the embodiment shown an electrically driven chart recorder was employed having a 1 ma full scale meter movement and having an electric motor 89 to drive the chart. At 2 second intervals a record is made of the meter reading, leaving a record such as is shown at 19 in FIG. 1.

It is obvious that the basic circuit elements described above could be combined in other ways to yield a tachometer similar to the embodiment shown. For instance, the filtering circuit of amplifier 84 could be placed ahead of the scaling circuit of amplifier 66 and the meter movement suitably connected to the output of 66. The scaling circuit could be entirely eliminated if desired, or the scaling and/or calibrating function could be achieved by suitably adjusting the voltage applied to the potentiometer.

Although certain specific applications and values have been given, it will be understood that these are merely for purpose of illustration and that the invention is one of wide applicability and that the tachometer can be used in any situation wherein it is desired to measure the speed at which a shaft is revolving, particularly when the speed is very low. Although a chart recorder has been shown, it is obvious that any kind of an indicating device could be used in the output circuit.

I claim:

1. A tachometer particularly adapted for low speed application comprising in combination:
   a. a single potentiometer having a resistance element with a first end and a second end, a continuously rotatable wiper engageable with said resistance element, and a narrow dead space between said ends of said resistance element,
   b. means for rotating said wiper along the resistance element from said first end to said second end and then across said dead space from said second end to said first end again, by a device whose speed is to be measured and which ordinarily causes said wiper to pass through many revolutions,
   c. means for applying a constant voltage across said ends of said resistance element,
   d. a differentiating circuit having means for detecting changes in the voltage of said wiper, and having means to provide a speed signal in proportion to the rotative speed of said wiper during periods that said wiper is engaged with said resistance element,
   e. detecting means for providing a control signal when said potentiometer wiper is within proximity of said dead space,
   f. an interrupting means whereby said speed signal is interrupted when said interrupting means is actuated by said control signal,
   g. a filtering circuit having means to produce a desired output substantially free of unwanted fluctuations from said speed signal when said interrupting means is not actuated,
   h. storage means to store the last voltage impressed thereon during intervals in which said interrupting means is actuated and to produce from said voltage an output approximating said desired output, said circuit thereby producing a continuous output representing the average rotative speed of said potentiometer wiper,
   i. means for calibrating said continuous output in desired units of measure, and
   j. means for indicating said continuous output.

2. The tachometer of claim 1 wherein said differentiating circuit includes a capacitor with a first end and a second end, an amplifier with an inverting input and an output, a feedback resistor, and a diode, and wherein the first end of said capacitor is connected to said potentiometer wiper and the second end of said capacitor is connected to the inverting input of said amplifier, and said diode is connected between the output of said amplifier and the second end of said capacitor, whereby said capacitor is automatically discharged through said diode when said potentiometer wiper engages the first end of said resistance element, thereby preparing said capacitor for the next rotation of said wiper.

3. The tachometer of claim 1 wherein:
   a. said detecting means includes a pair of amplifiers connected as voltage comparators, whereby the voltage on said wiper is compared with threshold voltages and said control signal is provided when said wiper rotates to within a predetermined small distance of said second end of said resistance element, and said control signal is discontinued when said wiper has passed over said dead space and has rotated to a predetermined small distance beyond said first end of said resistance element, and
   b. said interrupting means consists of a switch responsive to said control signal.

4. The tachometer of claim 1 in which said filtering circuit comprises an amplifier together with capacitors and resistors connected so that
   a. when said interrupting means is not actuated, said filtering circuit attenuates the higher frequency portion of said speed signal and passes the lower frequency portion of said speed signal to produce the desired output therefrom, and
   b. when said interrupting means is actuated, said filtering circuit stores the last impressed voltage on a plurality of capacitors and produces from said voltage an output to approximate said desired output.

5. The tachometer of claim 1 wherein:
   a. said potentiometer wiper is driven by a revolving component of a metering device, whereby the flow rate through said metering device is measured,
   b. a first calibrating means is provided to calibrate said tachometer according to the quantity represented by one revolution of said revolving component, and
   c. a second calibrating means is provided to calibrate said tachometer according to the largest expected flow rate through said metering device.

* * * * *